United States Patent
Rohani et al.

(10) Patent No.: US 10,545,229 B2
(45) Date of Patent: Jan. 28, 2020

(54) SYSTEMS AND METHODS FOR UNIFIED MAPPING OF AN ENVIRONMENT

(71) Applicants: Mohsen Rohani, Gatineau (CA); Song Zhang, Ottawa (CA)

(72) Inventors: Mohsen Rohani, Gatineau (CA); Song Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 353 days.

(21) Appl. No.: 15/262,719

(22) Filed: Sep. 12, 2016

(65) Prior Publication Data

US 2017/0307751 A1 Oct. 26, 2017

Related U.S. Application Data

(60) Provisional application No. 62/326,361, filed on Apr. 22, 2016.

(51) Int. Cl.
  *G01S 13/89* (2006.01)
  *G01S 13/86* (2006.01)
  (Continued)

(52) U.S. Cl.
  CPC ............ *G01S 13/89* (2013.01); *G01S 13/865* (2013.01); *G01S 13/867* (2013.01); *G01S 13/931* (2013.01); *G01S 13/87* (2013.01); *G01S 15/89* (2013.01); *G01S 17/89* (2013.01); *G05D 1/0257* (2013.01); *G05D 1/0274* (2013.01)

(58) Field of Classification Search
  CPC ... G07C 5/0808; G01S 13/865; G01S 13/867; G01S 13/931; G01S 15/931; G01S 17/936; G01S 2013/9332; G01S 2013/9375; G01S 2013/9378; G01S 7/00; G01S 7/40; G01S 7/497; G01S 7/52004; G01S 17/89; G01S 13/87; G01S 13/89; G01S 13/862; G01S 15/89; G05B 23/00; G05D 1/0257; G05D 1/0242; G05D 1/0231; G05D 1/0274
  See application file for complete search history.

(56) References Cited

U.S. PATENT DOCUMENTS 9,612,123 B1 * 4/2017 Levinson ............... G01C 21/32
9,707,961 B1 * 7/2017 Halder .................. B60W 40/04
(Continued)

FOREIGN PATENT DOCUMENTS

| CN | 103890606 A | 6/2014 |
|---|---|---|
| CN | 104024880 A | 9/2014 |
| CN | 104290745 A | 1/2015 |

OTHER PUBLICATIONS

Werber, Klaudius et al, Automotive Radar Gridmap Representations (2015). 2015 IEEE MTT-S International Conference on Microwaves for Intelligent Mobility, Heidelberg: (IEEE) Institute of Electrical and Electronics Engineers.
(Continued)

*Primary Examiner* — Olumide Ajibade Akonai (57) ABSTRACT

A method and system for generating a map of an environment based on information acquired by radar combined with information acquired from LIDAR, cameras, or a combination of the LIDAR and camera. The system uses a combination of data from a radar system combined with data from one or both of a camera system and LIDAR system to generate a unified map of the environment.

20 Claims, 4 Drawing Sheets

(51) Int. Cl.
   *G01S 13/93*   (2006.01)
   *G01S 15/89*   (2006.01)
   *G05D 1/02*    (2006.01)
   *G01S 13/87*   (2006.01)
   *G01S 17/89*   (2006.01)

(56) References Cited

U.S. PATENT DOCUMENTS

| | | | | |
|---|---|---|---|---|
| 9,921,307 | B2* | 3/2018 | Schmalenberg | G01S 13/865 |
| 10,077,054 | B2* | 9/2018 | Halder | B60W 40/04 |
| 2003/0154010 | A1 | 8/2003 | Rao et al. | |
| 2010/0063648 | A1* | 3/2010 | Anderson | G06N 5/043 |
| | | | | 701/1 |
| 2010/0066587 | A1* | 3/2010 | Yamauchi | G05D 1/0044 |
| | | | | 342/70 |
| 2010/0191391 | A1* | 7/2010 | Zeng | G01S 13/723 |
| | | | | 701/1 |
| 2010/0191461 | A1* | 7/2010 | Zeng | B60W 40/072 |
| | | | | 701/532 |
| 2013/0242284 | A1 | 9/2013 | Zeng | |
| 2016/0189544 | A1* | 6/2016 | Ricci | G07C 5/008 |
| | | | | 701/117 |
| 2017/0169627 | A1* | 6/2017 | Kim | G07C 5/0808 |
| 2017/0242117 | A1* | 8/2017 | Izzat | G01S 13/867 |

OTHER PUBLICATIONS

Brooker, Graham et al (2007). Millimetre Wave 3D Imaging for Industrial Applications. AusWireless 2007 Second International Conference on Wireless Broadband and Ultra Wideband Communications, Sydney: (IEEE) Institute of Electrical and Electronics Engineers.

Maddern, Will et al (2015). Leveraging Experience for Large-scale LIDAR Localization in Changing Cities, 2015 IEEE International Conference on Robotics and Automation, Seattle: (IEEE) Institute of Electrical and Electronics Engineers, pp. 1684-1691.

Christian Wolff, Radar Tutorial: Radar Basics, http://www.radartutorial.eu/01.basics/!rb02.en.html.

* cited by examiner

SYSTEMS AND METHODS FOR UNIFIED MAPPING OF AN ENVIRONMENT

CROSS-REFERENCE

This application claims the benefit of priority to U.S. Provisional Patent Application No. 62/326,361, filed Apr. 22, 2016 entitled "Systems and Methods for Unified Mapping of An Environment" which is hereby incorporated by reference in its entirety into the Detailed Description of Example Embodiments herein below.

FIELD

At least some example embodiments relate to sensing, mapping, and/or localization using radar, LIDAR, vision, or a combination of sensors, for autonomous vehicle applications.

BACKGROUND

Accurate high definition maps of various environments are used for various applications including autonomous vehicles, robotics, aircraft, drones, agriculture, civil engineering, geology, soil science, and mining. In certain applications, environmental mapping is also used to enable localization of an object.

Various methods presently exist for building high definition digital maps of an environment including methods and systems that rely on light detection and ranging ("LIDAR") as well as camera/vision based sensors and systems ("vision"). LIDAR uses ultraviolet, visible or near infrared light to image objects. LIDAR systems are highly accurate and can provide better range estimation compared to radar and vision systems. LIDAR can therefore be used to provide a high resolution two or three dimensional map of an environment. Wavelengths used in LIDAR systems may vary to suit the target and can range from approximately 10 micrometers to the ultraviolet range (e.g., approximately 250 nanometers).

Vision systems use visible light to image objects, are cheaper than LIDAR systems and can provide color information about an environment.

A combination of LIDAR and vision may be used to enhance the capabilities of three dimensional mapping. However, existing limitations of each of LIDAR and vision systems, including vulnerability to weather conditions for example, persist.

Additional difficulties with existing systems may be appreciated in view of the Detailed Description of Example Embodiments, below.

SUMMARY

Example embodiments are directed to a method and system for generating a unified map of an environment based on information acquired by radar, and LIDAR or vision systems or a combination of LIDAR and vision systems. The system includes a scanning radar, or combination of radars, that scans the surrounding environment and a LIDAR system, vision system or a combination of the two. The radar data is combined with the data from any one of the other sensors or any combination of them to form a unified map of the environment.

According to one example is a unified mapping system for mapping an environment of a moving vehicle. The system includes a radar system mountable to the vehicle, one or both of a LIDAR system or a vision system mountable to the vehicle, memory, and a processor in communication with the memory and configured to execute computer instructions stored on the memory. The computer instructions cause the processor to: receive radar map data about the environment from the radar system, receive further map data about the environment that has been acquired from one or both of a LIDAR system or a vision system, and generate a map of the environment based on both the radar map data and the further map data wherein the processor is configured to determine which of the radar map data and the further map data is most accurate based on sensed environmental conditions.

In some configurations, the processor is configured to generate the map by determining, for at least some objects, which of the radar map data and the further map data is most accurate. In some configurations, the system is configured to select which of the radar map data and the further map data is most accurate based on one or more of the following environmental conditions: weather conditions or ambient light levels. In some configurations, the vehicle is a ground-based vehicle.

According to an example embodiment is a unified mapping system for mapping an environment of a moving vehicle. The system includes a radar system mountable to the vehicle, one or both of a LIDAR system mountable to the vehicle, memory, and a processor in communication with the memory and configured to execute computer instructions stored on the memory. The computer instructions cause the processor to: receive radar map data about the environment from the radar system, receive further map data about the environment that has been acquired from one or both of a LIDAR system or a vision system, determine which of the radar map data and the further map data is most accurate based on sensed environmental conditions, and generate a map of the environment based on both the radar map data and the further map data wherein the map defines objects in the environment and attributes of the objects, wherein at least one attribute is determined based on the radar map data and at least one different attribute is determined based on the further map data.

In some configurations, the processor is further configured to determine a location of the vehicle within the map of the environment. In some configurations, the processor is further configured to generate navigation instructions based on the map of the environment.

According to an example embodiment is a method of mapping an environment of a moving vehicle that includes receiving radar map data about the environment from a radar system and receiving further map data about the environment from one or both of a LIDAR system or a vision system. A map of the environment is generated based on both the radar map data and the further map data. In some configurations, the method further comprises detecting a map data conflict between the radar map data and the further map data, estimating which of the radar map data and further map data has best accuracy, modifying the data based on best accuracy source, and flagging the modified data for review.

BRIEF DESCRIPTION OF THE DRAWINGS

Embodiments will now be described by way of examples with reference to the accompanying drawings, in which like reference numerals may be used to indicate similar features, and in which.

DETAILED DESCRIPTION OF EXAMPLE EMBODIMENTS

LIDAR and vision based systems can be used to generate map data. However, LIDAR systems have some limitations. For example, they are vulnerable to weather conditions. In addition, the wavelengths used in LIDAR systems are often not long enough to penetrate environmental contaminants such as dust and are attenuated by adverse weather conditions such as snow and fog. In addition, LIDAR system performance may be degraded if there is dirt, mud or some other physical contaminant on the LIDAR sensor. Accordingly, systems based on LIDAR exhibit poor performance in adverse weather conditions and LIDAR is therefore not a reliable sensor for localization in all conditions.

Vision systems can possess the same weaknesses as LIDAR in addition to being less accurate and being vulnerable to poor lighting conditions in the scanning environment. As a result, one challenge with environment sensing and mapping is the need for a high resolution method of mapping an environment that can be deployed in various weather conditions and which is not susceptible to contamination of the sensor.

Furthermore, for example, sensors like LIDAR and vision based sensors can be based on light reflection. Therefore they need to have clear line of sight and are often therefore mounted externally on a mapping vehicle.

Example embodiments are described herein in which mapping data collected using radar is combined with one or more of LIDAR and vision system based map data to create enhanced or unified map data.

Radar mapping systems use radio waves to determine the range, angle or velocity of objects or environment. Radar systems are often composed of a transmitter that emits radio waves (radar signals) in specified directions. When these come into contact with an object, some are reflected or scattered in many directions, and some are reflected back towards the transmitter. The radar system also includes a receiver that may be in the same location as the transmitter, and which captures the radar signals reflected by the environment. Radar systems may also include signal processors which may include digital signal processors for recovering useful radar signals or to interpret the received radar signals.

Radio waves are only weakly absorbed by the media through which they pass and therefore radar can be used to detect objects at relatively long ranges—ranges at which some other electromagnetic wavelengths are too strongly attenuated. In addition, such weather phenomena as fog, clouds, rain, falling snow, and sleet that block visible light are usually transparent to radio waves and accordingly radar can operate in adverse weather conditions. Furthermore, radio wave systems are more reliable than ambient visual systems, where lighting conditions can prove unreliable. Additionally, the characteristics of reflected radio waves may in some applications be processed to provide information on the reflecting material—for example, in at least some conditions, glass, metal, concrete and wood may all provide reflected radio waves having unique characteristics that allow the compositions of different reflecting surfaces to be estimated. Example embodiments are directed to a method and system for generating a unified map of the environment based on data acquired by radar combined with the data acquired from LIDAR systems, vision systems or a combination of them. The unified map contains features of the environment acquired by radar and features acquired by either vision, LIDAR or both.

Figure 1:
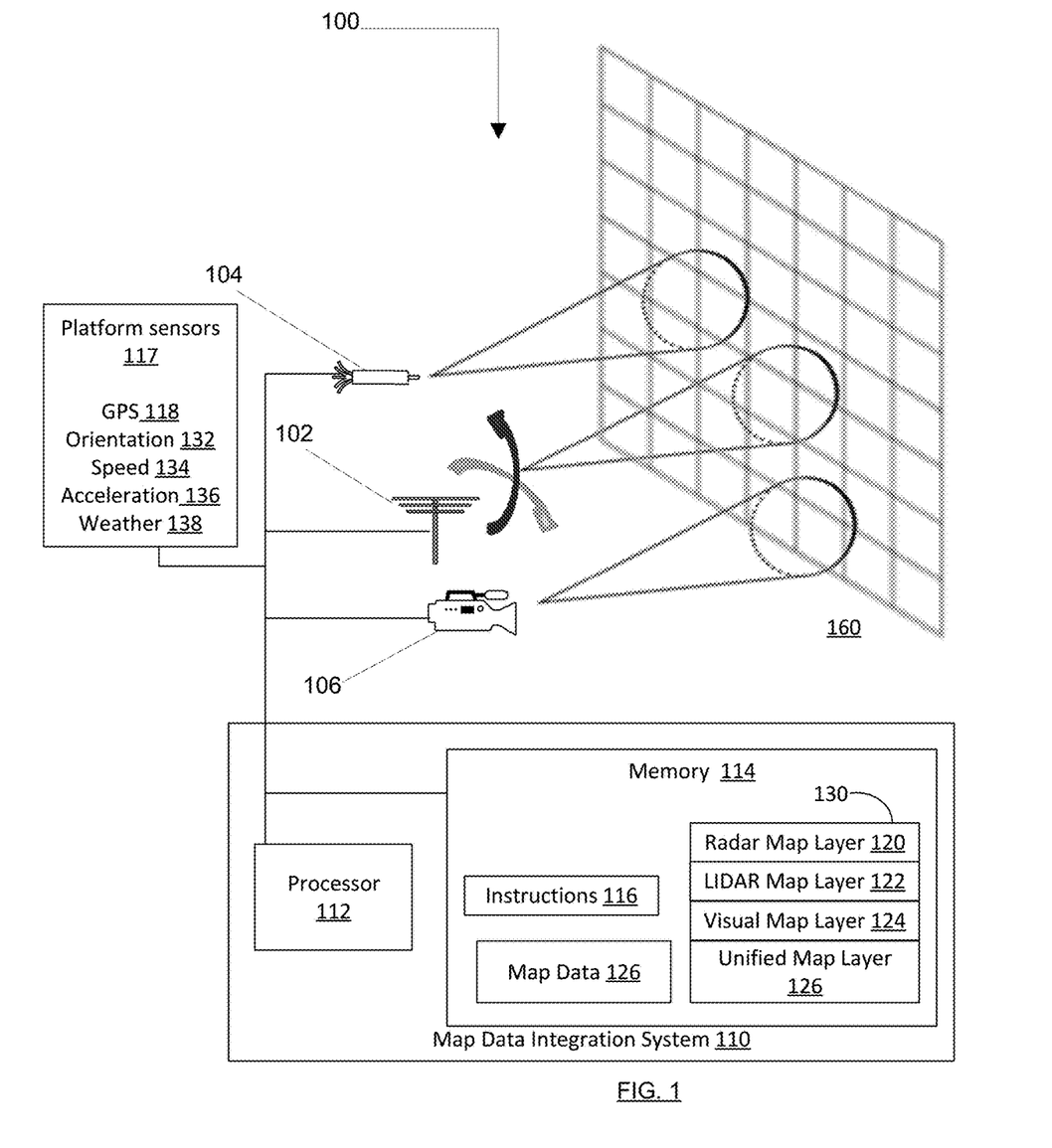
FIG. 1 is a diagrammatic view of an example unified mapping system, in accordance with an example embodiment.

In this regard, FIG. 1 illustrates an example embodiment of a unified mapping system 100 that can be used to build a digital unified map 130 of an environment 160. Unified mapping system 100 includes multiple map data sensors, and a map data integration system 110. In the illustrated embodiments, map data sensors include a radar system 102, a LIDAR system 104 and a vision system 106 that can each respectively generate radar map data, LIDAR map data and image map data as digital data for use by map data integration system 110. In one example, the system 100 also includes a plurality of platform sensors 117 for real-time sensing of the location, position and movement of the platform (for example a motor vehicle) that supports the radar system 102, LIDAR system, 104 and vision system 106. The platform sensors 117 could include a high accuracy satellite positional system 118 (such as a GPS system) that can provide localization data to system 110, orientation sensors 132 for recording platform yaw, pitch and roll, speed sensor 134, and accelerometer 136. Weather conditions sensors 138 such as temperature, humidity and barometric pressure sensors may also be included with platform sensors 117.

Map data integration system 110 includes a digital processor 112 that may include one or more digital processing units. Integration system 110 also includes memory 114 that has one or more transient and non-transient digital memory storage elements. Computer executable instructions 116 are stored in the memory 114 that configure the processor 112 and map data integration system 110 to perform the functions described in this document.

Figure 2:
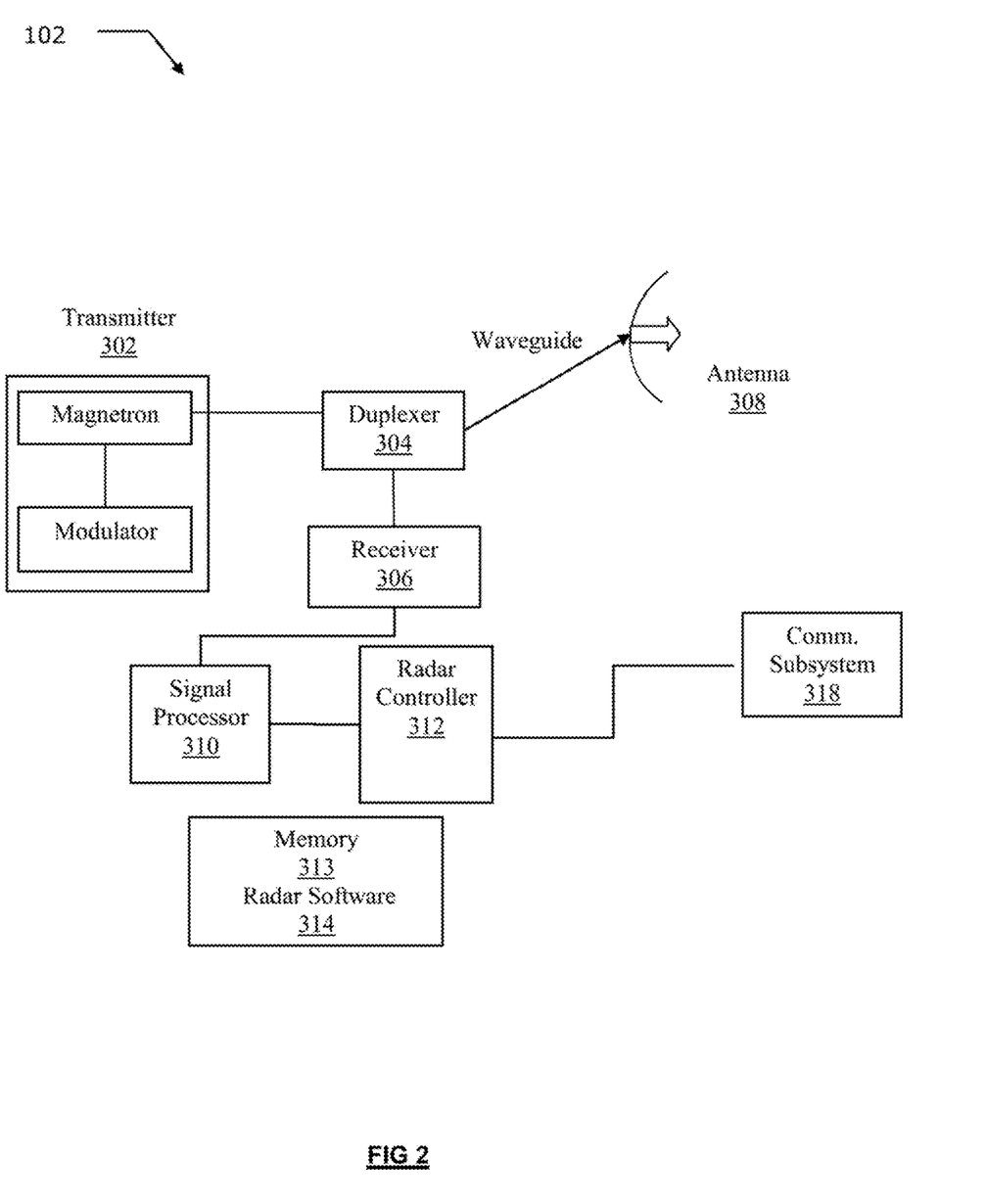
FIG. 2 is a block diagrammatic view of an example radar system, in accordance with an example embodiment.

FIG. 2 shows a block diagrammatic view of an example radar system 102. The radar system 102 includes at least one transmitter 302, at least one duplexer 304, at least one receiver 306, and at least one antenna 308. The antenna 308 may be rotated to direct the transmission of the radar signals and to facilitate the capture of reflected radar signals. The antenna 308 may be electrically steered, for example using phase shifting or frequency shifting, as is understood in the art. The antenna 308 can be directed so as to control the transmission of the radar signals and to facilitate the capture of reflected radar signals. The antenna 308 can be a dipole antenna and/or a grid-based antenna, for example, depending on the particular application. The duplexer 304 is used to alternate the antenna 308 between the transmitter 302 and the receiver 306, so that the same antenna 308 can be used for both transmit and receive functions. The antenna 308 is electrically or conductively connected to the transmitter 302 and the receiver 306. In some other example embodiments, a different antenna 308 is used for transmitting than for receiving.

The radar system 102 uses the radar transmitter 302 which controls the emitted radio signals in order to scan the surrounding environment 160 for example, and uses the receiver 306 to receive the reflections from the environment 160. The radar system 102 is configured, in example embodiments, to scan environment 160 in various directions, along azimuth angles at one or more fixed elevation angles, or in a vertical plane at one or more fixed azimuth angles. The radar scanning may be performed using solely electrical beam steering, or may use a combination of electrical beam steering and mechanical steering. For example, the system 102 can perform electrical beam scanning for varying elevation angles which can be used to achieve a lighter and smaller device compared to mechanical scanning radar devices, and mechanical scanning for varying azimuth angles, or vice versa. In an example embodiment, the radar system 102 can use an ultra wide band (UWB) radar that scans the environment in either planes using a beam with a narrow beam width to increase range resolution and reduce noise. The frequency and wavelengths of the radar system may be varied depending on the application. Further, multiple wavelengths can be used in order to gain additional information In example embodiments, the radar system 102 includes a signal processor 310 which processes signals received from the receiver 306. The system 300 further includes a radar controller 312 which is operably connected and in communication with the components of the system 102 and which may use radar software 314 (stored on memory 313 of the system 102) to further process the signals received by the system 102 or to perform a radar scan. The signals may be used for generating 2D or 3D maps and for control or response by other subsystems for example. The data received by the receiver 306 is processed by a signal processor 310 based on commands received from the controller 312. The controller 312 can include at least one processor (such as a microprocessor or other digital signal processor) which controls the overall operation of the radar system 300. The controller 312 may interact with the subsystems of the object on or in which it is mounted such as input subsystems, output subsystems, electrical subsystems and electro-mechanical subsystems which may already be part of the object. Various forms of software may be used to send or execute commands including to perform a radar scan.

The radar controller 312 may have access to memory 313 which can store instructions and programs for operation of the controller 312. The controller 312 can be configured to receive and send communications to internal or external devices (including map data integration system 110) by way of one or more communication subsystems 318. The controller 312 may include at least one data recording process for storing in memory 313 signals, data or images captured from the receiver 306 and processed by the controller 312. The radar data can be processed to generate, for example, a two or three dimensional point cloud of the environment or a radar image of the environment, which can be stored to memory 314, sent to other devices (including map data integration system 110). Multiple scans of the environment may be conducted to gather increased environmental detail and to generate a unified map with more environmental features. The radar system 102 may also use polarimetric radars which can provide more features of the environment to be included in the three dimensional map of the environment. Further, Synthetic Aperture Radar (SAR) imaging, multispectral emission, and interferometry radar techniques can further be used to facilitate generating of the map. In addition, other radar techniques or configurations may be used to produce radar map data including using radar transmitters/receivers where the radio waves are emitted sideward to the direction of travel of a moving object on which the radar system is mounted (side-looking radar), radar systems wherein the radio waves are emitted in the same direction as the direction of travel or any combination of techniques used to produce radar data.

In example embodiments, LIDAR system 104 is configured to scan the azimuth and elevation and may include dual oscillating plane mirrors, polygon mirrors, a laser scanner, or any combination of them. The LIDAR system 104 may use a hole mirror or beam splitter to collect a return signal.

Vision system 106 is configured to take multispectral images of an environment using a charge coupled device (CCD) sensor or a Complementary Metal Oxide Semiconductor (CMOS) sensor. The sensor may be embedded in a digital camera, thermal imaging camera, night vision camera, or other vision systems known in the art. The vision system may also include additional color image sensors, a multispectral imaging camera, illuminator, or any combination known in the art.

In at least some example embodiments, radar data, LIDAR data and camera data is stamped with or otherwise associated with location, positional and movement data from platform sensors 117. In some embodiments, each of the systems 102, 104 and 106 have one or more locational/positional sensors similar to those from the suite of platform sensors 117 integrated within such systems such that locational/positional data is associated with the radar, LIDAR and image map data in the processing systems of the respective systems 102, 104, 106.

In example embodiments, the radar and LIDAR systems 102, 104 include multiple transmitters and receivers, and vision system 106 has multiple camera sensors, for scanning multiple directions within environment 160 concurrently. Reference to scanning in any horizontal plane includes scanning along azimuth angles at a fixed elevation angle. Scanning in the vertical planes includes scanning along elevation angles at one or more fixed azimuth angles.

An example of the operation of the unified mapping system 100 to produce map 130 will now be described with respect to FIG. 3. In one example embodiment, at least the sensors (radar system 102, LIDAR system 104, and vision system 106) of the unified mapping system 100 are mounted in a moving vehicle and used to collect information about the environment 160 that surrounds the vehicle. The data collected from the systems 102, 104, 106 and platforms sensors 117 is used to create digital map 130, which in one example is a reference map created for subsequent use in a vehicle navigation system. In some examples the map data integration system 110 is also included in the vehicle and processes data in real time as the data is collected. In other example embodiments the map data integration system 110 performs all or some processing tasks on data that has been previously collected. In an example embodiment, the radar system 102, the LIDAR system 104, and the vision system 106 are not necessarily permanently mounted to the vehicle, and in some example embodiments may be mounted or removed from the vehicle as necessary.

Figure 3:
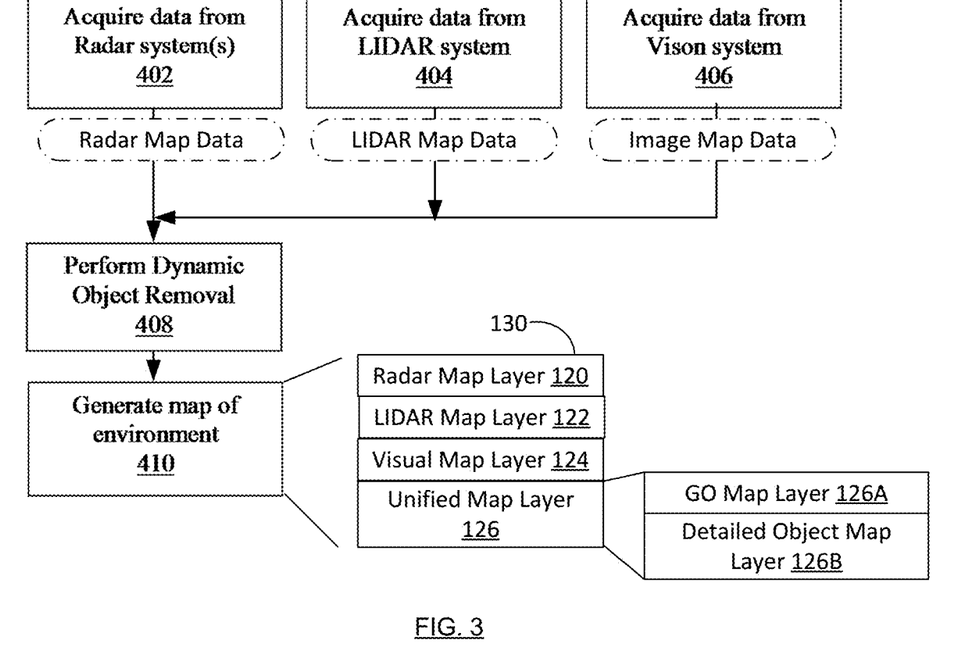
FIG. 3 illustrates a flow diagram for a method of operation of a mapping system to generate a unified map of an environment, in accordance with an example embodiment.

As shown in FIG. 3, the mapping process performed by mapping system 100 begins with the acquisition of radar map data from the radar system (action 402), LIDAR map data from the LIDAR system (action 404), and image map data from the vision system (action 406). In some example embodiments, the environmental data is sensed simultaneously by all three systems 102, 104, 106 and provided to the map data integration system 110. However, in at least some examples, some map data may be preexisting data that was gathered at a previous time—for example, in one embodiment, radar map data gathered directly from radar system 102 may be combined with one or both of LIDAR map data and vision map data obtained by map data integration system 110 from an indirect map data source such as a commercial map data repository rather than directly from LIDAR system 104 or vision system 106.

In one example embodiment, the processor 112 is configured to remove from radar map data, LIDAR map data and image map data any dynamic objects that have been captured by the respective systems (action 408). Dynamic objects are objects that are in the environment for only a short discrete time frame such as a moving object like a person or animal or other vehicle. Dynamic objects can be detected by, among other things, comparing map data from successive time slots to determine what objects are moving, and then the relevant data for such object removed from the map data or otherwise flagged within the data as relating to a dynamic object. In some examples, dynamic objects may be classed as such solely in dependence on detected stationary attributes of the object—for example a parked car may be classed as a dynamic object based on its size, shape, location and possibly other attributes. In some examples, dynamic objects may be classed as such based on their motion relative to the platform vehicle. For example, a car moving at the same speed as the platform vehicle may be classed as a dynamic object based on the relative difference in velocity between the car and the platform vehicle.

Figure 4:
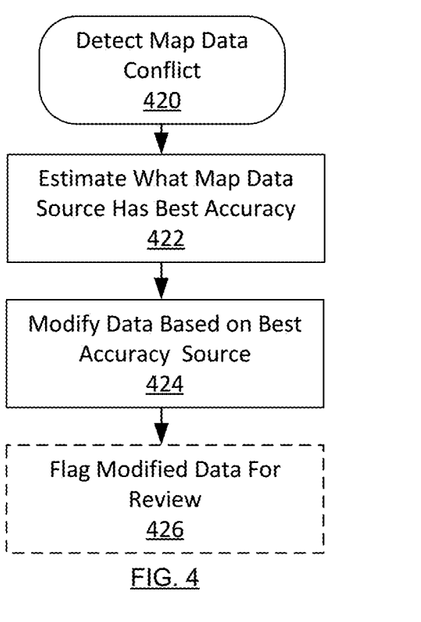
FIG. 4 illustrates a flow diagram of a data source conflict resolution procedure conducted by the mapping system of FIG. 1 in example embodiments.

In one example, the radar map data, LIDAR map data and vision data are compared to resolve conflicts and improve the accuracy of dynamic object removal. With respect to data conflicts, in one embodiment, processor 112 compares the data for a detected dynamic object in one map dataset (for example the LIDAR dataset) with the corresponding location data in the other map datasets (for example radar and image) to confirm that all three dataset agree, in which case the data relating to the dynamic object can be removed or flagged from all three datasets. However, in the event of a conflict, a resolution procedure such as shown in FIG. 4 can be performed by processor 112. In one example, the conflict resolution process of FIG. 4 is triggered when a conflict is detected between map datasets sourced from systems 102, 104 and 106 (action 420). By way of example, radar map data indicates a stationary vehicle sized object at a particular environmental location, however LIDAR map data and vision map each indicate a moving object at the same time and location. In one example, processor 112 is configured to estimate the relative accuracy of the map data sources (action 422) as an initial step in resolving the conflict. In an example embodiment the map data sources may have pre-assigned accuracy rankings or weightings; for example, under normal operating conditions, LIDAR map data is considered most accurate, followed by Vision map data followed by radar map data. In this regard, processor 112 is configured to examine data collected from one or more of the environment sensing systems 102, 104, 106 and platform sensors 117 to determine environmental conditions that may affect the predetermined accuracy ratings. For example, temperature data from a temperature sensor on platform sensor 117 and image data from vision system 106 may indicate that at the time of the data conflict a snow storm was occurring. As LIDAR systems and vision systems tend to be more adversely affected by snow than radar systems, the accuracy rankings of the datasets may be reordered for the particular data conflict at hand to give a higher weighting to the radar dataset, than the other two datasets. In such an example, all of the datasets are modified based on the information sensed by the radar dataset (action 424). In the illustrated example (namely radar map data indicates a stationary vehicle sized object at a particular environmental location, however LIDAR map data and vision map data each indicate a moving object), based on the conclusion that the radar map data is likely the most accurate, the object will be classed as a static object and the radar, LIDAR and image map datasets amended accordingly. In some examples, a flag may be created (action 426) to indicate that a conflict or ambiguity has occurred in respect of certain data, enabling the modified data to be located at a later time by a human or machine for verification purposes.

The accuracy ranking/estimation performed at action 422 can be configured to evaluate multiple conditions as sensed by the sensors, including: various weather conditions (rain, snow, fog, humidity, temperature, air pressure); platform vehicle speed, acceleration, movement; lighting conditions (LIDAR and vision systems can have reduced accuracy at night); quality assessment of data in the datasets; distance of the subject object from the mapping platform vehicle, etc. As noted above, in some examples, the LIDAR data may be assumed to be the most accurate unless sensed conditions indicate otherwise.

The above conflict resolution process of FIG. 4 can also be used to resolve data ambiguities in a particular dataset. For example, if radar map data provides an ambiguous indication as to whether an object is dynamic or not, and LIDAR map data and image map show an object as dynamic, the conflict resolution process will be triggered, and based on the ambiguity status of radar data the processing system will assign a nil ranking to the accuracy of the radar data in action 422 and hence classify the object as dynamic, with the result that the radar map data will be modified to concur with the LIDAR and image map data, resulting in the removal of the dynamic object from the radar map data.

In example embodiments, once data related to dynamic objects has been removed from the radar map data, LIDAR map data and image map data, the data is then processed to create a map of the environment 160 (Action 410).

As seen in FIGS. 1 and 3, in example embodiments, the unified map 130 generated by system 100 may include multiple layers, including radar map layer 120 that is derived substantially from radar map data, LIDAR map layer 122 that is derived substantially from LIDAR map data, and visual map layer 124 that is derived substantially from image data collected by vision system 106, and a unified map layer 126 that is derived from data from all of environmental data collection systems 102, 104, 106. The map data layers, which as shown in FIG. 1 are stored in memory 114 of the map data integration system 110, may be stored as distinct data files or as a single file in memory 114 for future access or sharing. The map layers may be in any appropriate data format or file format including in a data format used for storing coordinate data from GPS, such as HTML, Swiss map or other standard file formats known in the art. In some examples the different layers are stored as discrete map files that can be used independently of each other as resource maps.

In an example embodiment, the map layer that is substantially derived from any particular dataset can be processed with reference to the other map datasets, but will use its corresponding dataset as a base dataset. By way of example, processor's 112 primary resource for radar map layer 120 is the radar map data, from which the processor 112 creates a map that identifies the existence of objects in the environment 160 and location information for the objects. In some examples although the radar map data is used as the primary source of environmental data, the processor 112 will still access LIDAR and/or image map data to resolve ambiguities in the radar map data. For example, referring to FIG. 5, the processor 112 can be configured to determine when the radar data defining for a subject object or region in the environment falls below a predetermined ambiguity threshold (action 520). Such a threshold could be based on characteristics of the radar map data, or by comparing the radar map data to one or more of the LIDAR and image map datasets. Upon detecting an ambiguity radar map, the processor 112 can, in at least some embodiments, estimate which data source(s) is likely to have the most accurate data (action 522). Such a determination can be done in the same manner as described above in respect of action 422, with the selected "best accuracy" map data then being used to modify the radar map data for the subject object or region in the resulting radar map layer 120 (action 524). The modified data may optionally be flagged for future review (action 526).

Similarly, the LIDAR map data and the image map data used to generate LIDAR map layer 122 and visual map layer 124 can each also be refined based on radar map data and/or image map data in the event of data ambiguity. In some examples, the different map layers may be limited to specific subsets of information. For example, a radar map layer 120 may be processed to only include information about the type, size or shape of environmental objects detected, LIDAR map layer 122 may be processed to only include information about the distance to an object, and a vision may layer 124 may be processed to only include information about the color of an object.

In example embodiments, unified map layer 126 incorporates elements from all environmental data map sets. In one example, unified map layer 126 includes multiple sublayers, including a generic object (GO) map layer 126A and a detailed object map layer 126B, which may be stored as a collective file or may in some examples each be stored as discrete map files that can be used independently of each other as resource maps to support different types of mapping systems. By way of example, GO map layer 126 is configured to support mapping systems that rely on general environmental pattern matching in which the reference map is a depth map that generically specifies object shapes and distances in the environment but which does not provide detailed object identification. Detailed object map layer 126B is configured to support mapping systems that rely on highly specific and detailed object information for the environment, and in this regard detailed object map layer 126B includes information that identifies specific object types, locations and a set of detailed object attributes.

With respect to GO map layer 126, in one example embodiment the processor 112 is configured to define object shapes and distances by comparing data from the different map data sources and, in the event of a conflict for a specific shape or region, use the data from the estimated best map data source in accordance with a process similar to the map data conflict process described above in respect of FIG. 4. In one example, the LIDAR dataset, which will often be the most accurate in many operating conditions, is used as the primary source data for the GO map layer 126 unless a data conflict is detected, although radar data and/or image data could be used as the base dataset in some embodiments. In some embodiments, the base dataset (for example LIDAR data) is used as the source data for the GO map layer 126 and the other datasets being referenced only to resolve an ambiguity in the base map data by using an ambiguity resolution procedure such as that described above in respect of FIG. 5.

Figure 5:
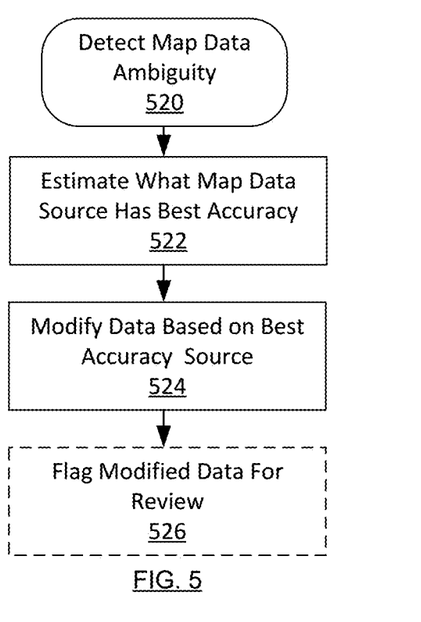
FIG. 5 illustrates a flow diagram of a map data ambiguity resolution procedure conducted by the mapping system of FIG. 1 in example embodiments.

Similarly, in respect of detailed object map layer 126B, one or both of the conflict resolution and ambiguity resolution procedures of FIGS. 4 and 5 can be applied to provide the best detailed dataset. In some example embodiments, data from the different map data sources can be used to assist with object identification. Furthermore, in some examples, detailed object attributes may be selectively determined from the respective map data sources that are best suited for determining the specific attribute.

By way of example, in one embodiment, the detailed object map layer 126B includes information that identifies specific object types, for example: building; tree, curb, traffic sign, traffic light, hydro pole, bridge support, crash barrier, rock, lane barrier and so on. Each of the objects will have associated coordinate data, as well as attribute data that may for example include object dimensions (in three dimensions), object color, object material, object density, object orientation and so on. In one example embodiment, object type determination is enhanced by comparing information from different map data sources—for example, an object shape as defined by LIDAR map data, object color data from image map data, and object material data from RADAR image data could be collectively used by processor 112 to distinguish a horizontal log from a concrete curb, or a stop sign from a small roadside tree.

With respect to object attribute data in detailed object map layer 126B, object color data could be determined from image map data, shape and dimensional data from LIDAR map data, and object material type from radar data. In some examples, objects may have associated child objects that also have type, location and attribute data. For example, a building may be associated with a set of child objects that define where windows and doors are located in the building or where a garage door or a ramp down to a garage door is located. In this regard, material type information from radar can provide an indication as to where windows, doors and a garage door are located on the building.

Thus in some example embodiments, the data received from the radar system 102, the LIDAR system 104 or the vision system 106 may be used as a base map to which the data received from the other systems may be superimposed upon the base map to generate the unified map layer 126. In some embodiments, relevant features of the data from the other systems may be used to supplement data from the base map system. The system may, in some applications, therefore exploit the strengths of each of the environment data collection systems to produce a unified map. The unified map may be two dimensional or three dimensional or may be a map with a combination of two and three dimensional features. Combining the data from a plurality of sensors may increase the robustness of the sensing system to weather conditions and increase the accuracy, flexibility and reliability of the unified map as well as further systems that use the unified map generated by the system, such as an autonomous vehicle.

In another embodiment, the individual map layers 120, 122 and 124 may be processed to remove features that are not required or which may not be accurate. For example, in adverse weather conditions, the data collected from LIDAR or vision systems which may not converge given the adverse weather conditions, may be removed from the LIDAR data layer or the vision data layer, leaving only the useful data in the data layers. These data layers may then be combined to form a unified map layer 126.

Figure 6:
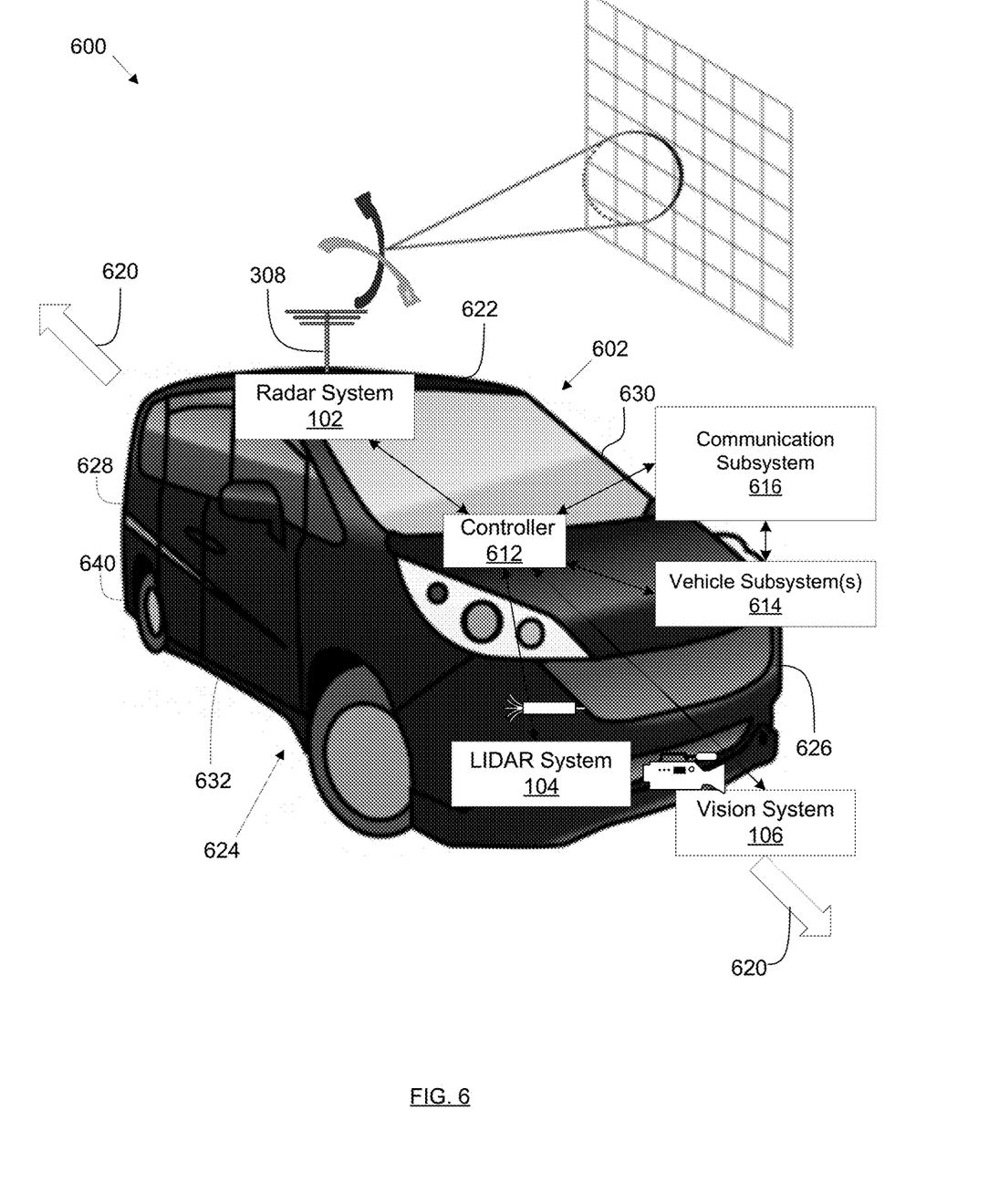
FIG. 6 shows a right perspective diagrammatic view of an example mapping system for a vehicle, in accordance with an example embodiment.

In example embodiments, the unified map 130 may be used as a reference map that may be further used in applications such as autonomous vehicles. In some embodiments, the processor 112 may also be configured to generate navigation instructions based on the unified map 130. For example, an autonomous vehicle equipped with one or more of radar, vision or LIDAR sensors can generate a map in real time which it may compare to one or more of the layers 120, 122, 124, 126A, 126B of the reference map 130. If there are discrepancies in the real-time map compared to the reference map 130, this may indicate that conditions are not optimal, for example, because of adverse weather conditions. The autonomous vehicle may then use the reference map 130 or any of the features of the reference map layers including the radar map layer 120, LIDAR map layer 122, vision map layer 124, unified map layer 126 or any combination of them for environment sensing, navigation, localization or other applications. Having a unified map 130, the localization system (or other intelligent system) can decide which layer is more reliable to use depending on the situations. For instance, in adverse weather conditions when the LIDAR solution cannot converge, the system may use radar features of the map and when the weather is good, the system may use all or any combination of LIDAR, radar and vision. In this regard, FIG. 6 shows a perspective diagrammatic view of an example sensing system 600 including a vehicle 602 with at least associated one radar system 102, at least one LIDAR system 104 and at least one vision system 106 in accordance with an example embodiment. As shown in FIG. 5, the vehicle 602 can be an automobile in an example embodiment, and the radar system 102 includes at least one antenna 308 mounted on the vehicle 602. Generally, the system 600 can be used for localization and mapping of the surrounding environment when the vehicle 602 is moving. For example, scanning along azimuth angles at one or more fixed elevation angles and vertical plane scanning at one or more fixed azimuth angles can be performed, in accordance with example embodiments.

The system 600 further includes at least one controller 612 which is operably connected to components of the radar system 604. The controller 612 can be similar to map data integration system 110 described above, and will have a reference map 130 (or one or more layers thereof) stored in memory. The system 600 may also include other vehicle subsystems 614 which include all or a subset of the previously mentioned platform sensors 117, operably connected to the controller 608. Vehicle subsystems 614 may also include autonomous driving controller for the vehicle 602.

The controller 612 can be configured to receive and send data from and to the radar system 102, the LIDAR system 104, the vision system 106, and the vehicle subsystem 614. The controller 612 may include at least one data recording process for storing data captured from the radar system 102, the LIDAR system 104, the vision system 106, and/or the vehicle subsystems 614, and/or data processed therefrom.

In an example embodiment, a vehicle subsystem 614 can receive a command from the controller 612 in order to perform the particular command based on data detected by the radar system 604, the LIDAR system 606 or the vision system 608. In an example embodiment, data or unified map information is sent to the vehicle subsystem 614, such as information in relation to the static environment, a static object or a dynamic object. The data can also include the identification of the object, and can include other pertinent information about the object such as its speed and vector. The vehicle subsystem 614 can be configured to, in an example embodiment, receive and interpret that received data and execute its own command function in response. Some vehicle subsystems 614 can include output subsystems (e.g. displays, heads-up displays, monitors, projectors, and/or speaker output, etc.) which include pertinent data about a detected object or environment, or a specified action or command to be taken by the driver or another vehicle subsystem 614. Some vehicle subsystems 614 can include input subsystems, such as touchscreen, microphone for voice input, steering control, and/or pedal control, etc. The sensing system 600 may also include a communication subsystem 616 which controls the communications between the subcomponents of the system 600.

Time of flight of the electromagnetic waves can be used to determine environment and objects around the vehicle 602. The determination of environment and objects can further be calculated based on the speed, vector and location of the vehicle 602, along with other information known to the controller 612. For example, speed, vector and location information of the vehicle 602 can be determined from speedometers and/or GPS.

Therefore, the absolute or relative speed of other objects can be determined, including their direction of travel. As well, the location of other objects and environment can be determined. Doppler effects based on the relative speed of the vehicle 602 can also be used as part of the calculations, as would be understood in the art.

As shown in FIG. 6, the vehicle 602 is configured to move in a direction of travel 620, for example using a motor drive and wheels in the case of an automobile to move horizontally forward or backward, in various paths to arrive at a destination. As shown in FIG. 6, the body of the vehicle 602 includes a top 622, bottom 624, front side 626 and rear side 628. As shown in FIG. 5, at least one of the antennas 308 is mounted on the top 622 of the vehicle 602. This can facilitate scanning of radar in multiple directions, such as horizontal scanning and vertical scanning, for example. In other example embodiments, at least one of the antennas 308 is mounted on or at the rear side 628 of the vehicle 602. In other example embodiments, antennas 308 are mounted on both sides 630, 632 of the vehicle 602, to collectively detect electromagnetic radiation in regards to the surroundings.

The vehicle 602 can comprise a shell which generally surrounds the vehicle 602. In an example embodiment, at least part of the shell can be formed of radio wave transmissive material such as rubber, plastic, composite or polymer. In such an embodiment, the antenna 308 is mounted interior to the radio wave transmissive material. This protects the antenna 308 or from environmental factors, conceals it from vision, and still permits radio waves to be transmitted and received through the material of the shell. This contrasts with light-based detection systems (LIDAR and Vision) which would be typically blocked by the shell of the vehicle 602.

Examples of concealed locations for antenna(s) 108 can be interior to or within a bumper 640, such as the bumper 640 at the rear side 628 or a front bumper. Other suitable areas of the vehicle 602 include a roof or additional roof cover at the top 622 which is formed of such material. Another example area of the shell is at the left side 630 and the right side 632, for example at a middle portion or lower bumper area, and at least two antennas 606 or radar systems are used in this case. The vehicle 602 can, in example embodiments, be ground-based including an automobile, truck, tractor, bus, motorcycle, locomotive, subway, hovercraft, snowmobile or heavy equipment vehicle. The vehicle 602 can, in example embodiments, be a water-based vehicle such as a boat, hovercraft, or jet ski. The vehicle 602 can, in example embodiments, be a flying-based vehicle such as a jet, helicopter or unmanned aerial vehicle (UAV). (Mapping vehicle used with system 100 could also be any of these vehicles). In some example embodiments, the vehicle 602 comprises a fully autonomous vehicle or a semi-autonomous vehicle.

In example embodiments, the controller 612 is configured to use the data from radar system 102, LIDAR system 104 and vision system 106 to provide a unified data about the environment of vehicle 602. In this regard, the controller 612 can be configured to process the data in the manner described above to generate real-time unified map data that includes one or more of a radar map layer, a LIDAR map layer, visual map layer and unified map layer. The real time unified map data can then be compared by controller 612 with the stored unified reference map 130 and used to determine vehicle position. In example embodiments, processor 112 can be configured to generate navigation instructions based on the unified map of the environment generated from the environment and the controller 612 may be further configured to use the navigation instructions generated by the processor 112 for automated vehicle guidance or other applications.

In the described methods or block diagrams, the boxes may represent events, steps, functions, processes, modules, messages, and/or state-based operations, etc. While some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The above discussed embodiments are considered to be illustrative and not restrictive. Example embodiments described as methods would similarly apply to systems, and vice-versa.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A map data integration system, comprising:
   memory;
   a processor in communication with the memory and configured to execute computer instructions stored on the memory, wherein execution of the computer instructions causes the processor to:
   receive radar map data about an environment acquired by a radar system of a vehicle;
   receive LIDAR map data about the environment acquired by a LIDAR of the vehicle; and
   receive image map data about the environment acquired by a vision system of the vehicle;
   and
   generate a reference map of the environment comprising a radar map layer derived from the radar map data, a LIDAR map layer derived from the LIDAR map data, a visual map layer derived from the image map data, and a unified map layer derived from the radar map data, the LIDAR map data, and the image map data.

2. The system of claim 1, wherein execution of the computer instructions further causes the processor to detect one or more dynamic objects in the radar map data, and remove data corresponding to each detected dynamic object from the radar map data.

3. The system of claim 1, wherein execution of the computer instructions further causes the processor:
   determine which one of the radar map data, the LIDAR map data and the image map data is the most accurate based on sensed environmental conditions, wherein the sensed environmental conditions is one or more of weather conditions or ambient light level; and
   modify the radar map data, the LIDAR map data, and the image map based on the one of the radar map data, the LIDAR map data and the image map data which is determined to be the most accurate.

4. The system of claim 1, wherein the execution of the computer instructions further causes the processor is configured to detect one or more dynamic objects in the LIDAR map data, and remove data corresponding to each detected dynamic object from the LIDAR map data.

5. The system of claim 1, wherein the execution of the computer instructions further causes the processor to detect dynamic objects in the image map data, and remove data corresponding to each detected dynamic object from the image map data.

6. The system of claim 1 wherein the processor is further configured to store the radar map layer, the LIDAR map layer, the visual map layer, and the unified map layer as respective distinct data files or a single data file.

7. The system of claim 1 wherein the unified map layer comprises a generic object (GO) map layer and a detailed object map layer.

8. A unified mapping system for mapping an environment of a vehicle, comprising:
   a radar system mountable to the vehicle for generating radar map data about;
   a LIDAR system mountable to the vehicle for generating LIDAR map data about the environment of the vehicle;
   a vision system mountable to the vehicle for generating image map data about the environment of the vehicle;
   a map data integration system comprising:
   memory;

a processor in communication with the memory and configured to execute computer instructions stored on the memory, wherein execution of the computer instructions causes the processor to:

receive radar map data about the environment from the radar system;

receive LIDAR map data from the LIDAR system;

receive image map data from the vision system;

generate a reference map of the environment including a radar map layer derived from radar map data, a LIDAR map layer derived from the LIDAR data, a visual map layer derived from the image map data, and a unified map layer derived from the radar map data, the LIDAR map data, and the image map data;

wherein the reference map includes static objects in the environment and attributes of the static objects, wherein at least one attribute is determined based on the radar map data and at least one different attribute is determined based on the one of the LIDAR map data and the image map data.

9. The system of claim 8, wherein execution of the computer instructions causes the processor to determine which one of the radar map data, the LIDAR map data and the image map data has best accuracy based on sensed environmental conditions, to modify the radar map data, the LIDAR map data, and the image map data based on the one of the radar map data, the LIDAR map data, and the image map data which has the best accuracy.

10. The system of claim 9, wherein the sensed environmental conditions is one or more of weather conditions or ambient light level.

11. The system of claim 8, further comprising a navigation system configured to receive the unified map from the map data integration and to determine a location of the vehicle within the reference map of the environment.

12. The system of claim 8, wherein the navigation system is further configured to generate navigation instructions for the vehicle based on the reference map of the environment.

13. A method of generating a reference map of an environment, the method comprising:

receiving radar map data about the environment acquired by a radar system of a vehicle;

receiving LIDAR map data about the environment acquired by a LIDAR system of the vehicle;

receiving image map data about the environment acquired by a vision system of the vehicle; and generating a reference map of the environment comprising a radar map layer derived from the radar map data, a LIDAR map layer derived from the LIDAR map data, a visual map layer derived from the image map data, and a unified map layer derived from the radar map data, the LIDAR map data, and the image map data.

14. The method of claim 13, further comprising:

detecting a map data conflict between the radar map data, the LIDAR map data, and the image map data;

determining which of the radar map data, the LIDAR map data and image map data has best accuracy;

modifying the radar map data, the LIDAR map data, and the image map data based on the one of the radar map data, the LIDAR map data and the image map data which is determined to have the best accuracy;

flagging the modified radar map data for review.

15. The method of claim 14 further comprising processing at least one of the radar map data, the LIDAR map data, and the image map data to remove dynamic objects.

16. The method of claim 14, wherein determining which of the radar map data, the LIDAR map data and the image map data has the best accuracy is based on sensed weather conditions determined based on data collected by one or more environmental sensing systems.

17. The method of claim 13, further comprising:

detecting a map data ambiguity in the radar map data;

estimating which one of the radar map data, the LIDAR map data and image map data has best accuracy;

modifying the radar map data based on the one of the radar map data, the LIDAR map data and the image map data which has the best accuracy; and flagging the modified radar map data for review.

18. The method of claim 17, wherein detecting a map data ambiguity in the radar map data comprises detecting a map data ambiguity when the radar map data for a subject object or region in the environment falls below a predetermined ambiguity threshold.

19. The method of claim 13 further comprising:

storing the radar map layer, the LIDAR map layer, the visual map layer, the unified map layer as respective distinct data files or a single data file.

20. The method of claim 13 wherein the unified map layer comprises a generic object (GO) map layer and a detailed object map layer.

* * * * *